No. 718,220. PATENTED JAN. 13, 1903.
R. C. SAYER.
CONDUCTOR, CONDUIT, AND COLLECTOR FOR ELECTRICITY ON RAILWAYS.
APPLICATION FILED OCT. 7, 1901.
NO MODEL. 5 SHEETS—SHEET 1.

Witnesses:— Albert Jones
Samuel Percival

Inventor
Robert Cooke Sayer
By his Attorneys
Wheatley & MacKenzie

No. 718,220. PATENTED JAN. 13, 1903.
R. C. SAYER.
CONDUCTOR, CONDUIT, AND COLLECTOR FOR ELECTRICITY ON RAILWAYS.
APPLICATION FILED OCT. 7, 1901.
NO MODEL. 5 SHEETS—SHEET 2.
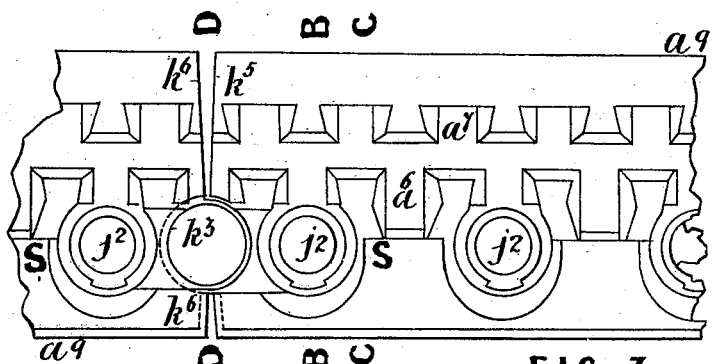
FIG. 3.
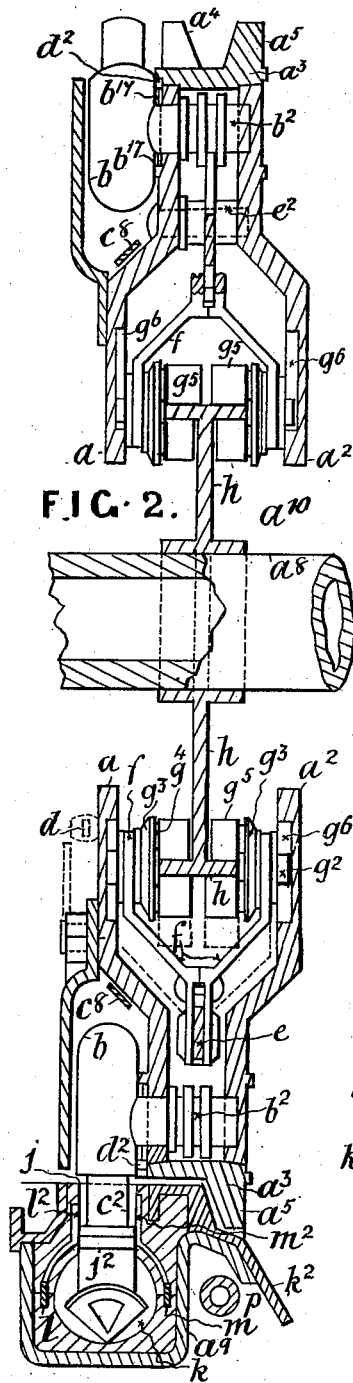
FIG. 2.
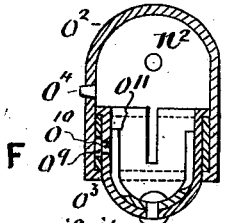
FIG. 10.
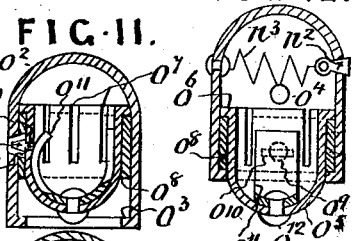
FIG. 11. FIG. 12.
FIG. 9.
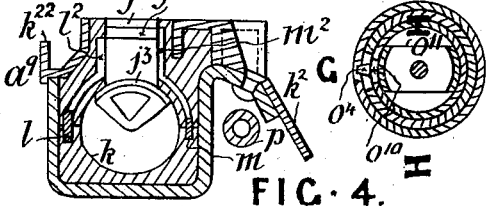
FIG. 4.
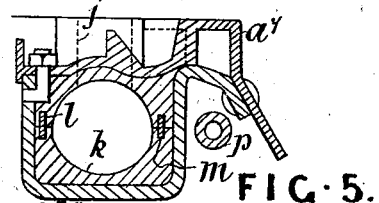
FIG. 5.
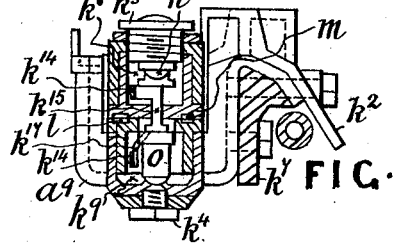
FIG. 6.
Witnesses:— Albert Jones
Samuel Percival
Inventor
Robert Cooke Sayer
By his Attorneys
Wheatley & Mackenzie No. 718,220. PATENTED JAN. 13, 1903.
R. C. SAYER.
CONDUCTOR, CONDUIT, AND COLLECTOR FOR ELECTRICITY ON RAILWAYS.
APPLICATION FILED OCT. 7, 1901.
NO MODEL. 5 SHEETS—SHEET 3.
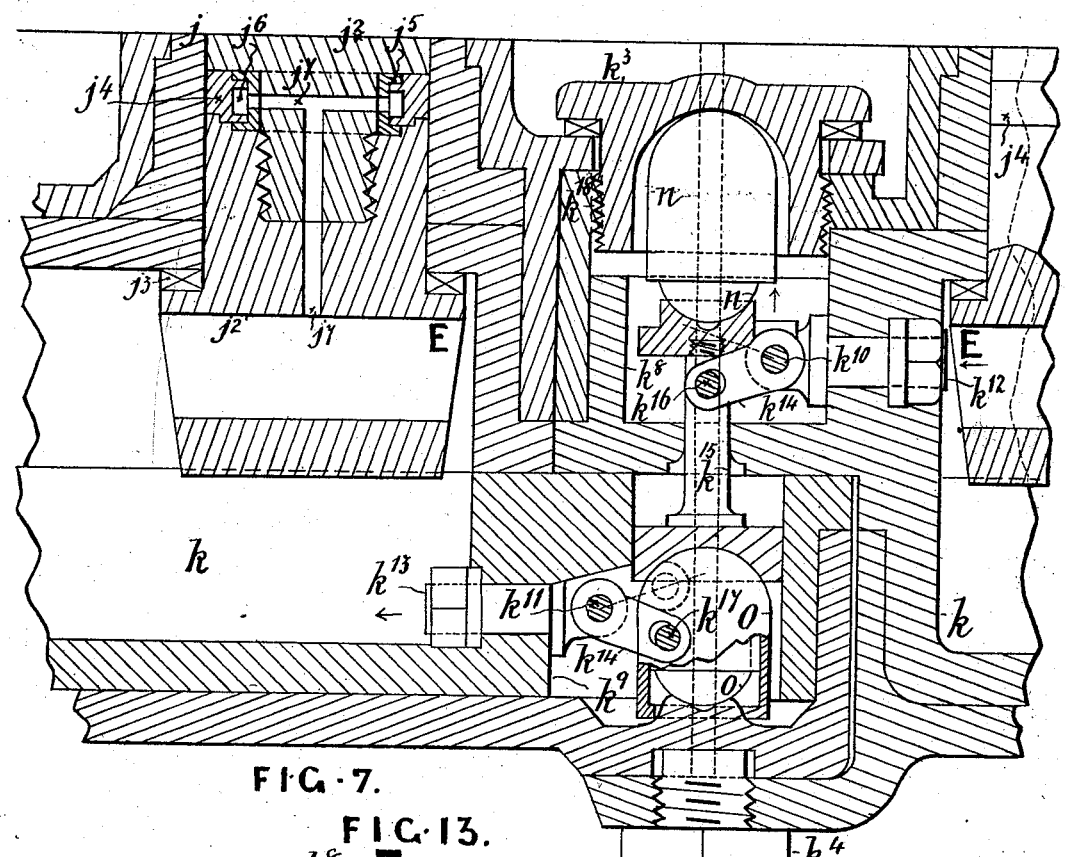
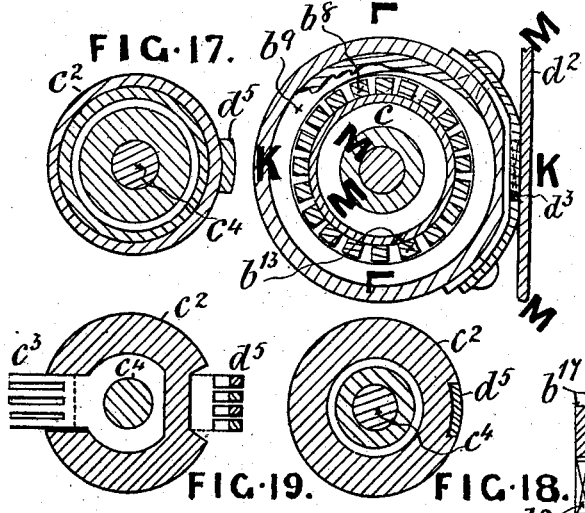

No. 718,220. PATENTED JAN. 13, 1903.
R. C. SAYER.
CONDUCTOR, CONDUIT, AND COLLECTOR FOR ELECTRICITY ON RAILWAYS.
APPLICATION FILED OCT. 7, 1901.
NO MODEL. 5 SHEETS—SHEET 4.

Witnesses:— Albert Jones
Samuel Percival

Inventor
Robert Cooke Sayer
By his Attorneys
Wheatley & Mackenzie.

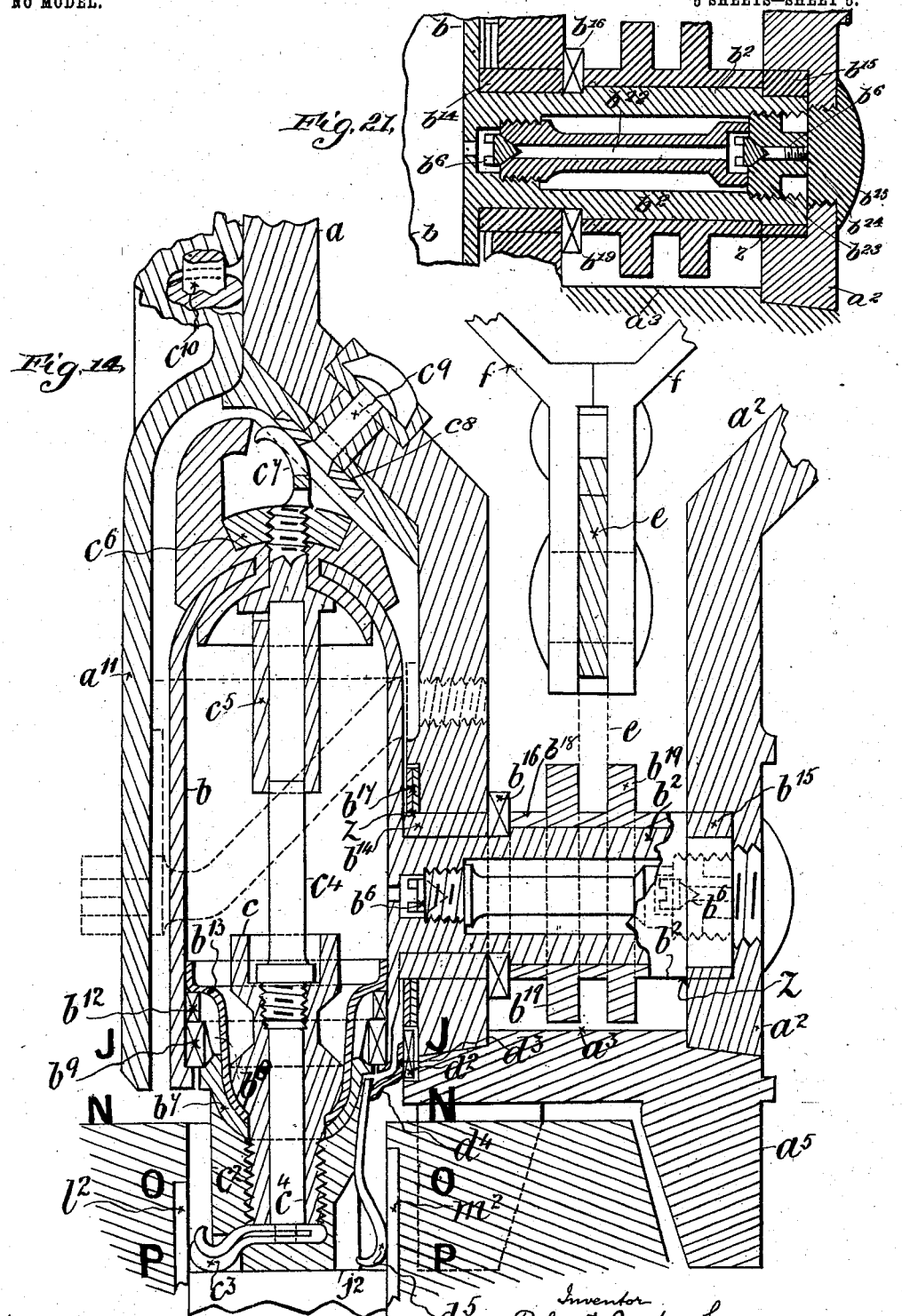

UNITED STATES PATENT OFFICE.

ROBERT COOKE SAYER, OF BRISTOL, ENGLAND.

CONDUCTOR, CONDUIT, AND COLLECTOR FOR ELECTRICITY ON RAILWAYS.

SPECIFICATION forming part of Letters Patent No. 718,220, dated January 13, 1903.

Application filed October 7, 1901. Serial No. 77,925. (No model.)

*To all whom it may concern:*

Be it known that I, ROBERT COOKE SAYER, a subject of the King of Great Britain and Ireland, residing at 11 Clyde road, Redland, Bristol, England, have invented certain new and useful Improvements in or Connected with Conductors, Conduits, and Collectors for Electricity on Railways and the Like; and I do hereby declare the following to be a full, clear, and exact description of the invention, such as will enable others skilled in the art to which it appertains to make and use the same.

This invention has for its object to provide a means for picking up current from a conductor situated within the walls of a closed tubular rail, there being neither slot nor surface contact, and comprises a wheel carried on a vehicle in which chambers with plungers that can slide are mounted on pivots sliding in suitably-shaped guide-slots in the wheel, so that the plungers depress valves in the tubular rail and then make contact with the conductors in the rail.

This invention has further for its object to provide a joint for the tubular rail comprising chambers with expansible fluid-actuating taps in the rail, so that when a rail is to be removed the taps are automatically closed to retain the pressure in the adjacent rails.

Figure 1:
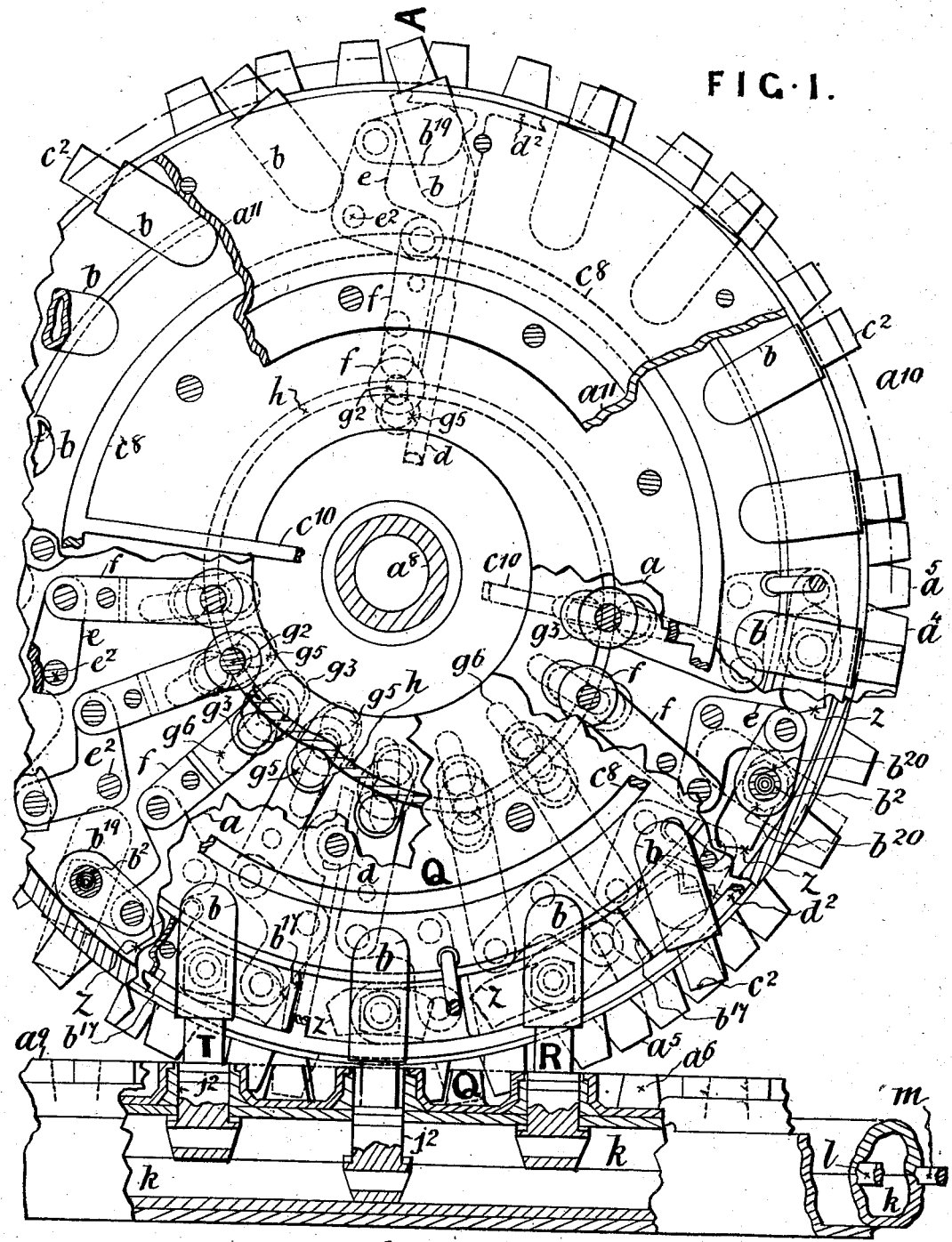
Figure 8:
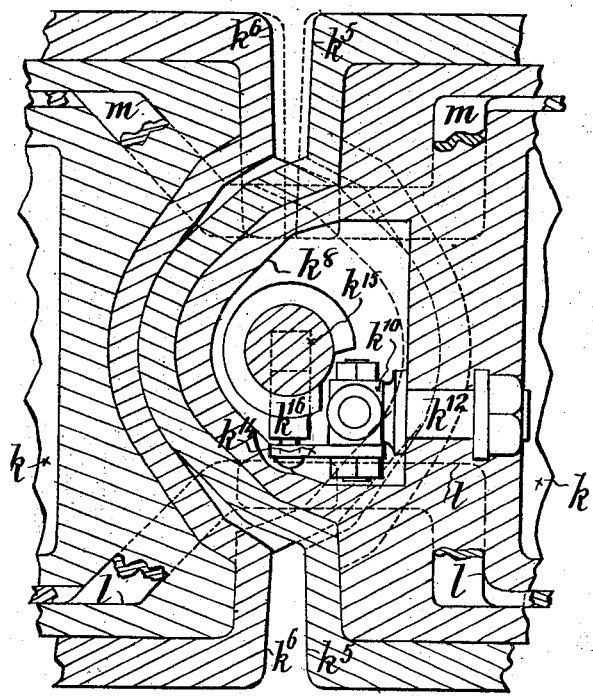
Figure 15:
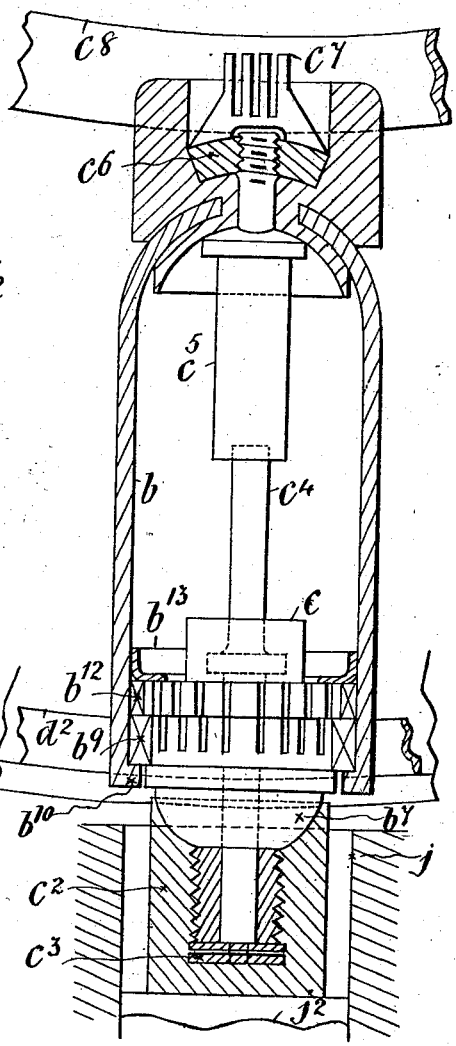
Figure 16:
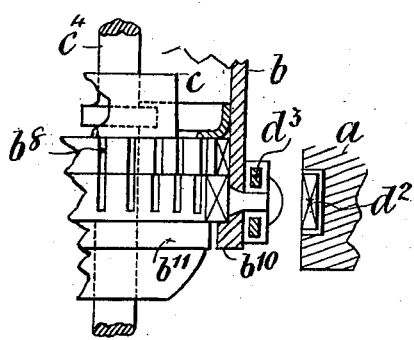

In the accompanying drawings, Figure 1 is a sectional elevation of the wheel and rail in their relative positions; Fig. 2, a cross-section at A A, Fig. 1; Fig. 3, a plan of part of a rail and a joint; Figs. 4, 5, and 6, cross-sections at B B C C D D, Fig. 3; Fig. 7, a vertical section of the rail joint and valves; Fig. 8, a horizontal section at E E, Fig. 7; Fig. 9, a sectional plan of a rail-joint elastic cushion at F F, Fig. 10; Figs. 10 and 11, sections at G G, Fig. 9; Fig. 12, a section at H H, Fig. 9; Fig. 13, a section at J J, Fig. 14; Fig. 14, a section at K K, Fig. 13; Fig. 15, a sectional elevation at L L, Fig. 13; Fig. 16, a sectional elevation at M M, Fig. 13; Figs. 17, 18, and 19, sections at N N O O P P, Fig. 14; Fig. 20, a section at Q Q, Fig. 1. Fig. 21 is a detail view of the spindle and its attachments.

The wheel $a^{10}$ is formed of two duplicate sides $a$ and $a^2$, a periphery $a^3$, having alternate beveled teeth $a^4$ and $a^5$ and a fixed axle $a^8$, hollow elastic cushion-chambers $b$, having pivots $b^2$, an inner tube 22, two pin-valves $b^6$, a valve-seat piece $b^{23}$, and closing-screw $b^{24}$, to the threads of which a pump is screwed for charging when the plug-screw $b^{25}$ is removed and the wheel turned to bring the spindle $b^2$ central with $b^{25}$. The chambers are formed of a cup $b^7$, split at $b^8$ to spring outwardly for its projections to clip and rest upon a spring-ring $b^9$, previously inserted into the chamber $b$ and resting on its stop $b^{10}$. The cup $b^7$ has a stop $b^{11}$ outside the chamber $b$ and within a spring-ring $b^{12}$, a cup packing-ring $b^{13}$, insulator $c$, screwed to a projecting plunger $c^2$, of insulating material, brush-conductor $c^3$, telescopic conductors $c^4$ and $c^5$, secured by a screw-nut $c^6$, forming a brush-contact $c^7$ to always keep in contact with the ring $c^8$, secured by rivets $c^9$ to the side $a$ of the wheel. This ring has radial conductors $c^{10}$, leading where required. The negative current returns by radial conductors $d$, Figs. 1 and 2, a ring $d^2$, Fig. 14, spring-bushes $d^3$ and $d^4$ on the outside of the chamber $b$ to make contact with a brush $d^5$, carried on the plunger $c^2$.

The pivots $b^2$ are mounted in slide-blocks $b^{14}$ and $b^{15}$, having straight sides and faces to fit and slide in the guide-slots $z$, formed in the sides $a$ and $a^2$ of the wheel, as shown. A spring-ring $b^{16}$ covers $b^{17}$ over the slots $z$, able to lap and ride over one another, a collar $b^{18}$ integral with or keyed to links $b^{19}$, that hinge on bell-cranks $e$. The cranks $e$ center on the sides $a$ and $a^2$ at $e^2$ and are hinged to stirrup-links $f$. These latter hinge on trunnions $g$, that carry pins $g^2$ to slide in slots $g^6$ in the sides $a$ and $a^2$, a base-plate $g^3$ and pins $g^4$ to carry rollers $g^5$ to rotate as they traverse a cam-path $h$, fixed on the axle $a^8$ when driven by the sides $a$ and $a^2$, acting on the pins $g^2$ to give oscillating motions to the pivots $b^2$, the slide-blocks $b^{14}$ and $b^{15}$, and the chambers $b$, that are protected by a guard $a^{11}$. The rail $a^9$ has alternate teeth $a^6$ and $a^7$, spaced and formed to match the teeth $a^4$ and $a^5$ of the wheel $a^{10}$, valve-chambers $j$, with valves $j^2$, made tight by pressure in the tube $k$, thrusting the packed seats $j^3$ against the tube and by a passage $j^7$ communicating with an annular chamber $j^6$, formed between an elastic insulating packing-ring $j^4$ and a rigid flanged ring $j^5$ to thrust the ring $j^4$ against the walls of the valve-chamber $j$. The walls of the rail-tube $k$ carry positive electric conductors $l$ and negative conductors $m$, both of which have branches which are carried up the walls of the valve-chambers $j$ at $l^2$ and $m^2$. Main feed-conductors $p$, protected under the hood $k^2$ of the rail, connect the conductor $l$ with the generator. The rails when not continuous are hinged, Figs. 6 to 12. The upper part of one tube $k$ projects over the lower part of the other to form chambers $k^8$ and $k^9$, having curved sockets, as shown in Fig. 8, to form when put together with the screw-cap $k^3$ and set-screw $k^4$ a hinge having lateral play for sluing limited by the splayed ends $k^5$ and $k^6$ and the fish-plate $k^7$, Fig. 6. The chambers $k^8$ and $k^9$ have taps $k^{10}$ and $k^{11}$ to admit the pressure from the tubes $k$ through the pipes $k^{12}$ and $k^{13}$. The chambers $k^8$ and $k^9$ communicate with one another through the interstices around the spindle $k^{15}$. The levers $k^{14}$ of the taps are worked by the spindle $k^{15}$ through its arms $k^{16}$ and $k^{17}$ and fluid-pressure cushion-chambers $o$ and $n$, which are formed similarly to the chambers $b$, Figs. 9 to 12. The chamber $o$ has an outer case $o^2$, stop $o^3$, pin-valve $o^4$ to admit pressure, a cup $o^5$, serrated at $o^7$, a port $o^{10}$, closed by a flat valve $o^{11}$, secured at $o^{12}$, a stop $o^6$, a split ring $o^8$, with a recess $o^9$. The cushion-chamber $n$ is formed similarly; but instead of an inlet-valve $o^4$ it has an outlet-valve $n^2$, kept closed by a spring $n^3$, Fig. 12.

The working is as follows: The rail-tube $k$, chambers $b$, $n$, and $o$ having compressed elastic fluid so that the plunger $c^2$ of chamber $b$ is able to thrust in the valves $j^2$ and the cushion-chamber $n$ to thrust in the cushion-chamber $o$ and the wheel $a^{10}$ being suspended clear of the rail for the teeth $a^4$ and $a^5$ to engage with the teeth $a^6$ and $a^7$ of the rail, so that power in the wheel can thrust it along and be guided laterally by the teeth, or if the wheel be free and thrust along the rail teeth rotate it and gives motion by the pins $g^2$ in the slots $g^6$ to the rollers $g^5$ to traverse the cam-path $h$ and actuate the stirrups $ff$, cranks $e$, links $b^{19}$, and pivots $b^2$ to traverse the slots $z$ for the straight sides of the slide-blocks $b^{14}$ and $b^{15}$ to meet the straight ends of the slots $z$ and turn the chamber $b$ to alight upon a valve $j^2$ at R, Fig. 1, in a vertical position, and so rest while the wheel passes on and brings the other ends of the slots $z$ up to it, when it is raised off the valve at T, so that during the period the plunger $c^2$ rests on the valve $j^2$ it thrusts the valve down to expose the positive conductor branch $l^2$ for the brush $c^3$, Fig. 14, to make contact for a current to pass from the generator the conductors $p$ $l$ $l^2$ $c^3$ $c^4$ $c^5$ $c^6$ $c^7$, ring $c^8$, and radial conductor $c^{10}$ to a motor or for other purpose, it also exposes the negative conductor branch $m^2$ for the brush $d^5$ to make contact for a current to pass from the motor or other part to the conductors $d$, Fig. 2, ring $d^2$, brushes $d^3$ and $d^4$, Fig. 14, contacts $d^5$, branch $m^2$, conductor $m$, and the generator. Should the rail-guards on the car have missed a thin but strong obstruction placed on a rail-valve and the plunger $c^2$ alights upon it, the plunger $c^2$ and its parts are thrust into the chamber $b$ against the pressure in it, which reprojects the plunger $c^2$ to act on the next valve, as before. At the joints of the rails the conductors $l$ and $m$ overlap, Figs. 6 and 8, and retain contact as the hinge works. The rail-joints are put together after the cushion-chambers $o$ and $n$ are put into place and secured by the screw-cap $k^3$ and set-screw $k^4$. The screwed cap $k^3$ closes the chambers $k^8$ and $k^9$, thrusts the cushion-chamber $n$ down and the levers $k^{14}$ by the spindle $k^{15}$ and arms $k^{16}$ and $k^{17}$ and admits the pressure from the tube $k$ through the taps $k^{10}$ and $k^{11}$, collapses the cushion-chamber $o$, as shown, and brings the valve $o^4$, Fig. 11, opposite the recess $o^9$, into which it is thrust, and enables the pressure of the tube $k$ to enter chamber $o$. Should a rail and its chambers $k^8$ and $k^9$ leak, the pressure in chamber $o$ closes the valve $o^4$ and expands against the lower pressure in chamber $n$ and collapses it, actuates the spindle $k^{15}$, arms $k^{16}$ and $k^{17}$, and levers $k^{14}$, and closes the taps $k^{10}$ and $k^{11}$. When a rail retaining its pressure is taken out, the chambers $k^8$ and $k^9$ exhaust through a passage $k^{18}$, which is provided to prevent the cap $k^3$ blowing out when it leaves its thread, but the pressure in the adjacent rails is retained as above. In order that the rails $a^9$ and wheel $a^{10}$ may be adapted to the working of cars suspended from the rail $a^9$, they are suspended upside down, their flanges $k^2$ and $k^{22}$ are made horizontal, carry wheels or rollers to run upon them, and by proper bearings upon their spindles they carry the wheel $a^{10}$ for its teeth to engage with those of the rail, as above explained, to drive and guide the car or act as a free wheel when the wheels upon the flanges $k^2$ guide.

What I claim, and desire to secure by Letters Patent, is—

1. A wheel formed as box with sides and a periphery suspended over a rail, a hollow toothed rail, teeth on the wheel to engage with teeth on the rail, slots in the wheel, slide-blocks in slots, a pivot mounted on the slide-blocks a chamber mounted on the pivot, a fixed cam acting on the slide-blocks, a valve in the hollow rail, the slots and slide-blocks and cam being so formed that on the rotation of the wheel the chamber is thrust down and meets and opens on the valve in a vertical position and remains in this vertical position until withdrawn by the further rotation of the wheel.

2. A wheel formed as a box with sides and a periphery suspended over a rail, a hollow toothed rail, teeth on the wheel to engage with teeth on the rail, slots in the wheel, slide-blocks in slots, a pivot mounted on the slide-blocks, a chamber mounted on the pivot, a fixed cam acting on the slide-blocks, a valve in the hollow rail, conductors within insulating-walls of the tube and having insulated branches in the walls of the valve, conductors provided with contacts in the chamber, the slots and slide-blocks and cam being so formed that on the rotation of the wheel the chamber is thrust down and meets and opens on the valve in the vertical position and remains in this vertical position until withdrawn by the further rotation of the wheel and at the same time the connection is made between the conductors in the rail and on the chamber.

3. A wheel suspended over or touching a tubular rail, teeth on the wheel to engage with teeth in the rail formed to keep the wheel laterally in the direction of the rail; slots in the sides of the wheel, a pivot passing through a slot in the sides of the wheel hinged to links and one arm of a bell-crank centering on the wheel whose other arm is hinged to a stirrup-link connected to a trunnion-hinge, base-plate, and pins carrying rollers able to traverse, above and below, a fixed cam-path carried on a fixed axle of the wheel; a pin on the said trunnions passing into a radial slot on each side of the wheel and driving the rollers with the wheel, the stirrups, cranks and links being actuated by the eccentricity of the cam-path, to cause the pivot to traverse the slots in the wheel as it rotates; the slots and the pivot and its bearing-blocks guided in them being so formed that a chamber carried on the pivot is directed for its bottom plunger to successively meet one of properly-distanced valves in the rail in a vertical position, and allow the wheel and its slots to pass on while the plunger and its chamber are held on the valve; and after leaving the rail-valve, and before meeting the next the chamber and pivot are traversed back along the slots to their former position ready to act similarly, substantially as described.

4. At the ends of tubular rails, a fished hinged joint formed by part of one rail overlapping that of the other, connected by screw-caps and bolts; chambers in the lapped ends stop-taps with levers in the chambers; a spindle with arms connecting the levers; fluid-pressure cushion-chambers able to alternately open and close the taps by means of the spindle and arms when charged with different pressures at different times and by the pressure from the rail-tubes, a means for closing the connecting-valves on the leakage in a rail-section, a means for closing the connecting-valves when one rail-section is removed and a means for keeping continuity of the electric tube-rail, conductors through the rail-joints, substantially as described.

5. A box-wheel $a^{10}$, with a fixed axle $a^8$ suspended over or under, a rail $a^9$, for teeth $a^4$ and $a^5$ to engage with teeth $a^6$ and $a^7$ of the rail; on the axle $a^8$ a fixed cam-path $h$ on the wheel $a^{10}$ rollers $g^5$ to traverse the cam-path $h$ carried on pins $g^2$ formed in one with parts $g^3$, $g^2$ in slots $g^6$ and $g$ carrying stirrups $f$; bell-cranks $e$ centering on the wheel $a^{10}$ at $e^2$, links $b^{19}$ hinging on bell-cranks $e$ and a pivot $b^2$, with bearing-blocks $b^{14}$ and $b^{15}$ within and able to traverse slots $z$ in the wheel $a^{10}$, each formed to suit the other to turn the pivot $b^2$ and its chamber $b$ as they traverse the slot $z$, a means in pivot $b^2$ to charge the chamber $b$ with pressure; forming the chamber $b$ cylindrically and to act as an elastic fluid-pressure cushion, with a cup $b^7$ formed with springs $b^8$ to rest on a split ring $b^9$ that rests on the stop $b^{10}$; a stop $b^{11}$ on the cup $b^7$, a split ring $b^{12}$, a cup-packing $b^{13}$, and insulator $c$ carrying the plunger $c^2$ by a screw-thread, able to be thrust within the chamber $b$, a guard $a^{11}$, and covers $b^{17}$; on the rail $a^9$, valve-chambers $j$, valves $j^2$; a tube $k$ with fluid-pressure in it to act on the valves $j^2$, to keep them tight by packed seats $j^3$, elastic insulating flange-ring $j^4$, rigid flange-ring $j^5$, chamber $j^6$, and passages $j^7$ connecting $k$ and $j^6$; hinge-joints to the rails, having chambers $k^8$ and $k^9$, connecting screw-cap $k^3$ and bolt $k^4$, ends $k^5$ and $k^6$ splayed, or not to allow lateral play, and a fish-plate $k^7$; taps $k^{10}$ and $k^{11}$ in the chambers $k^8$ and $k^9$ to admit pressure from the tube $k$; levers $k^{14}$ to the taps $k^{10}$ and $k^{11}$ able to be worked by parts $k^{15}$, $k^{16}$ and $k^{17}$ and fluid-pressure collapsible cushion-chambers $o$ and $n$, chamber $o$ having parts $o^2$ and $o^3$, an inlet-valve $o^4$, a cup $o^5$ cut at $o^7$, a port $o^{10}$, a valve $o^{11}$, a stop $o^6$, a split ring $o^8$, and a recess $o^9$; an exit-valve $n^2$ in the cushion-chamber $n$, instead of an inlet, and different pressure to cushion-chamber $o$; on the wheel and rail and their parts insulated positive electric conductors $p$, $l$, $l^2$, $c^3$, $c^4$, $c^5$, $c^6$, $c^7$ ring $c^8$ and arms $c^{10}$ connecting a generating-station to a motor, or other part; and its return insulated negative conductors $d$, ring $d^2$, brushes $d^3$ and $d^4$; contact $d^5$, branch $m^2$, and conductor $m$ of the rail $a^9$ to the generator substantially as described.

In testimony whereof I have affixed my signature in presence of two witnesses.

ROBERT COOKE SAYER.

Witnesses:
W. SEFTON CLARKE,
LIONEL A. WILSON.